April 22, 1952 — H. P. KEIL — 2,594,179
DUPLICATING APPARATUS
Filed Feb. 5, 1947 — 13 Sheets-Sheet 3
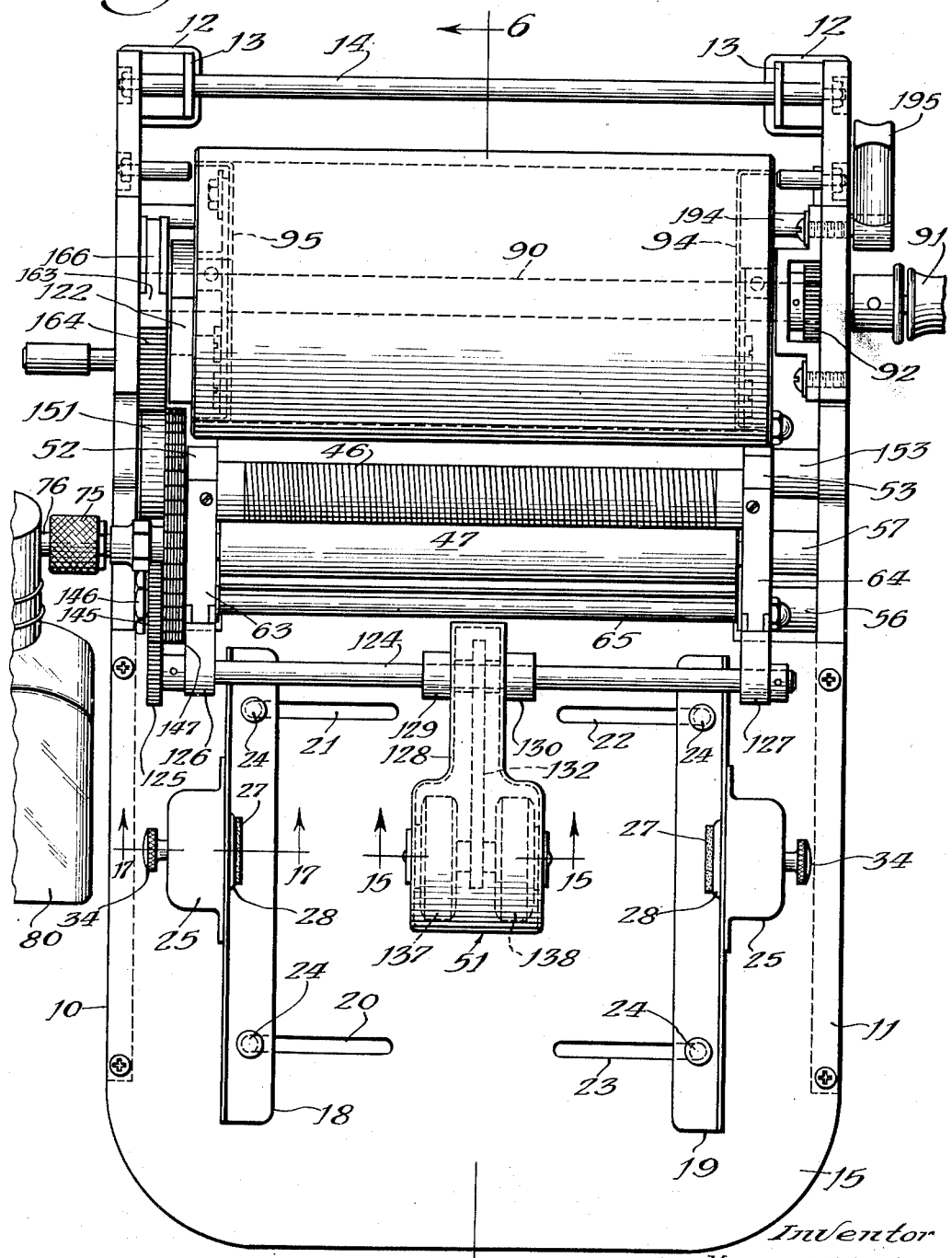

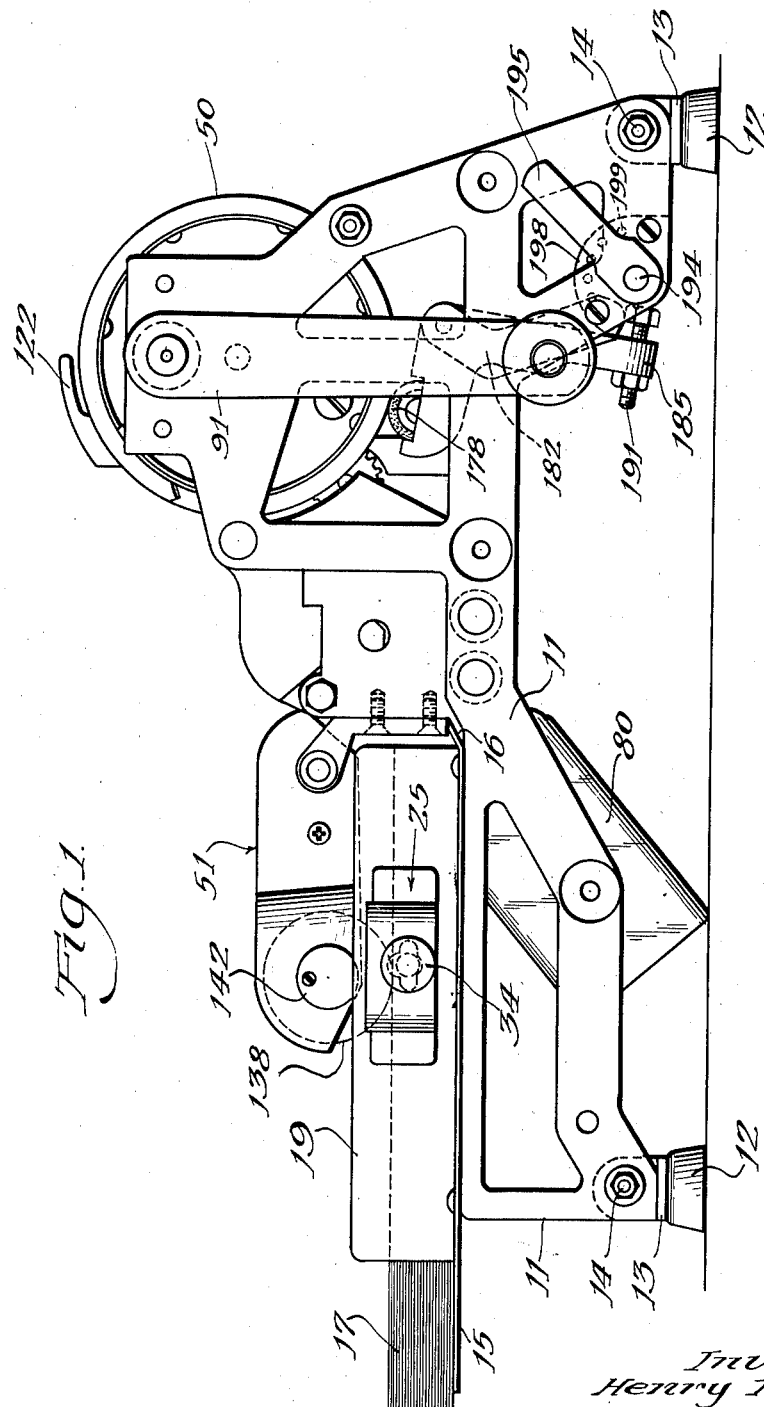

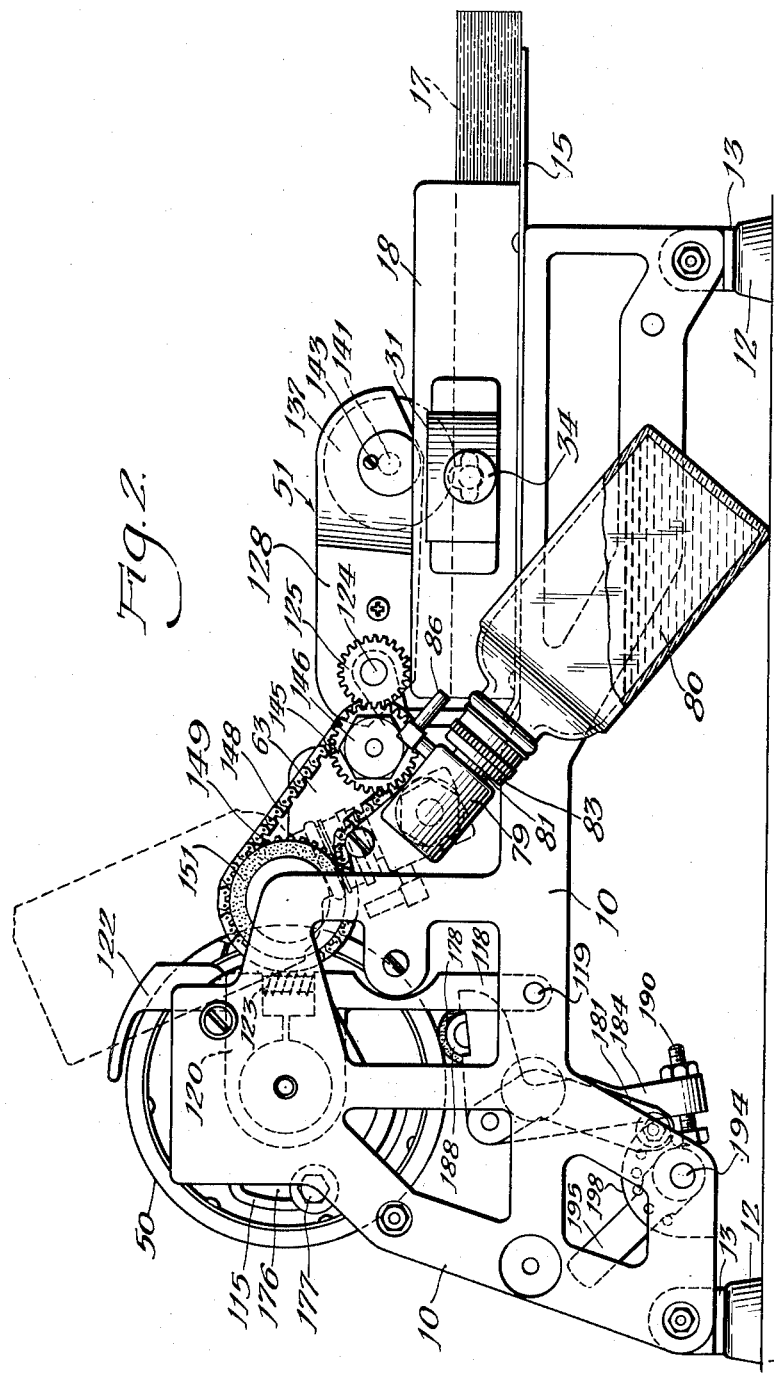

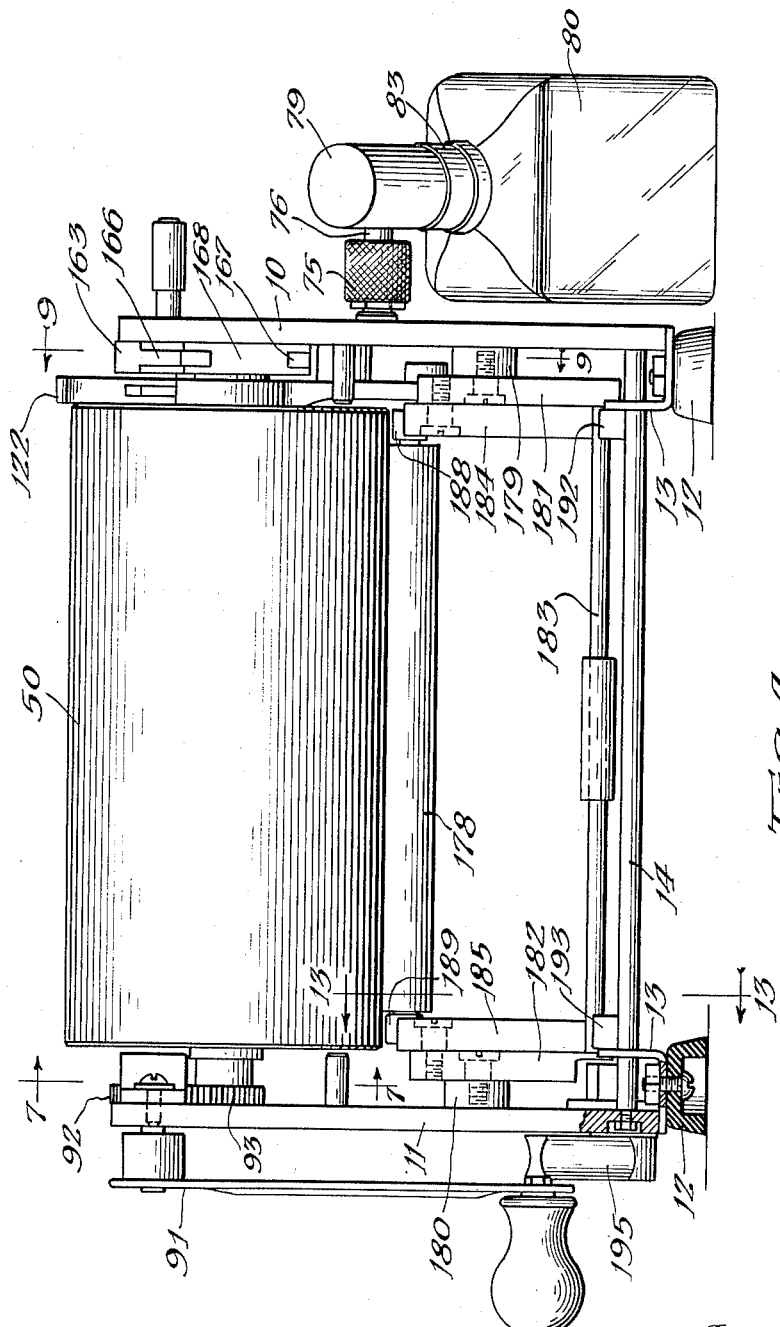

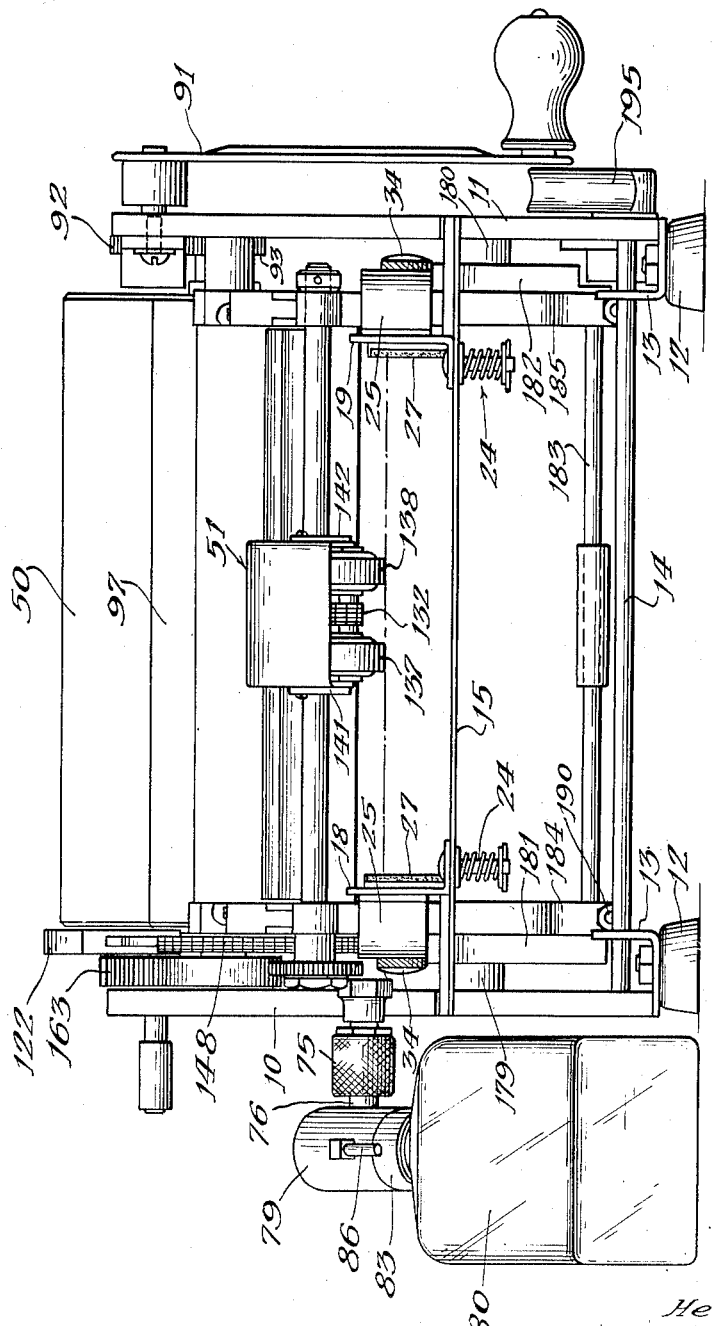

April 22, 1952 H. P. KEIL 2,594,179
DUPLICATING APPARATUS
Filed Feb. 5, 1947 13 Sheets-Sheet 6
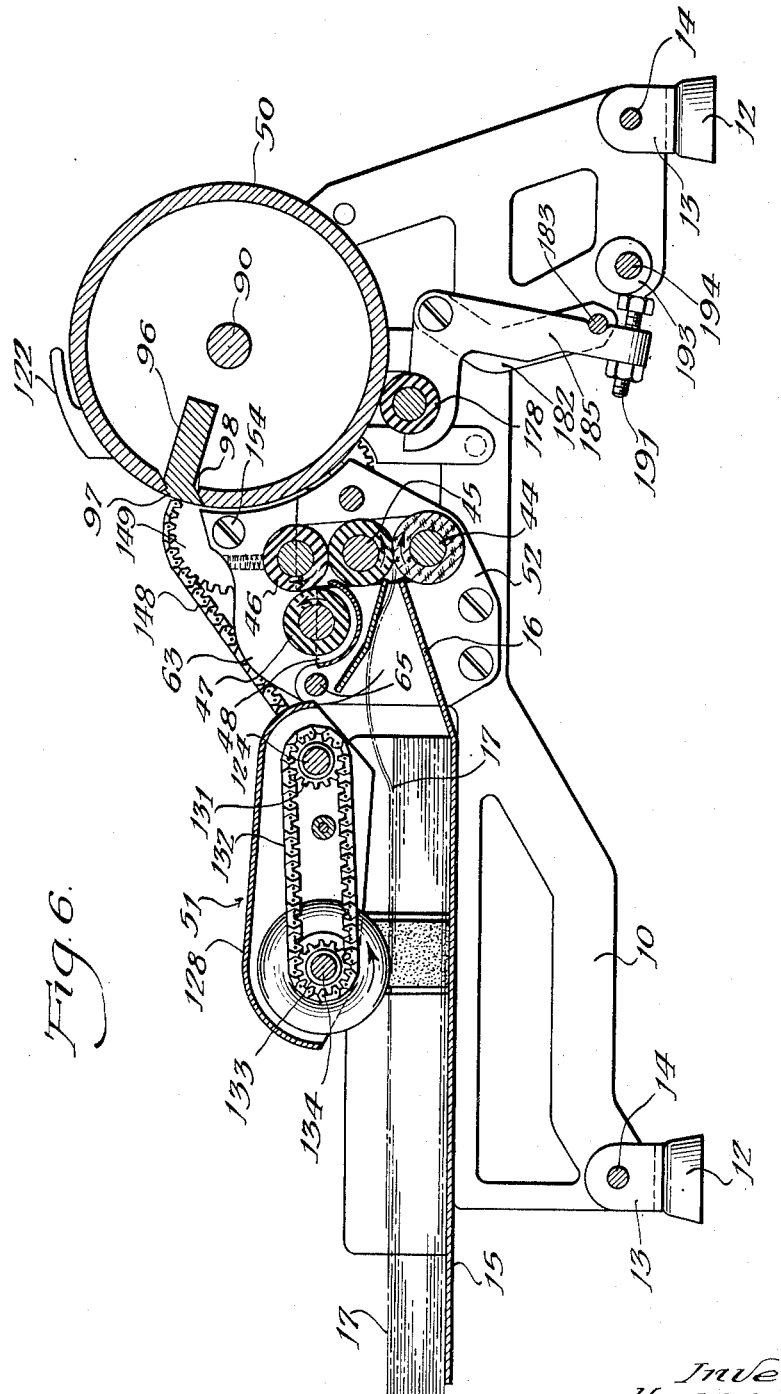
Inventor:
Henry P. Keil
By: Treek Wells
Attorney

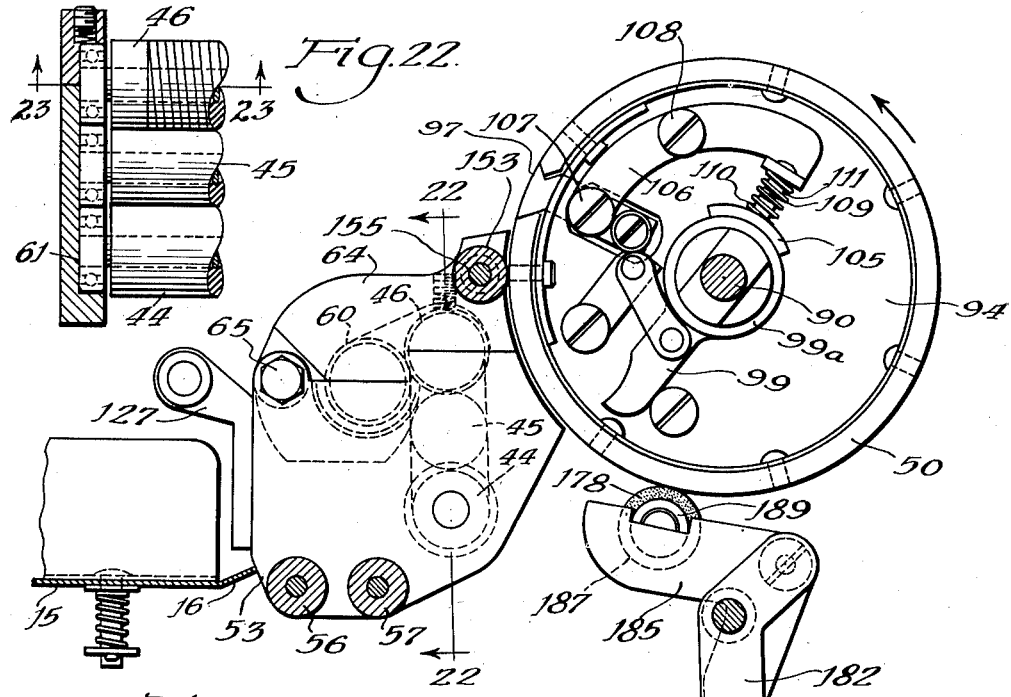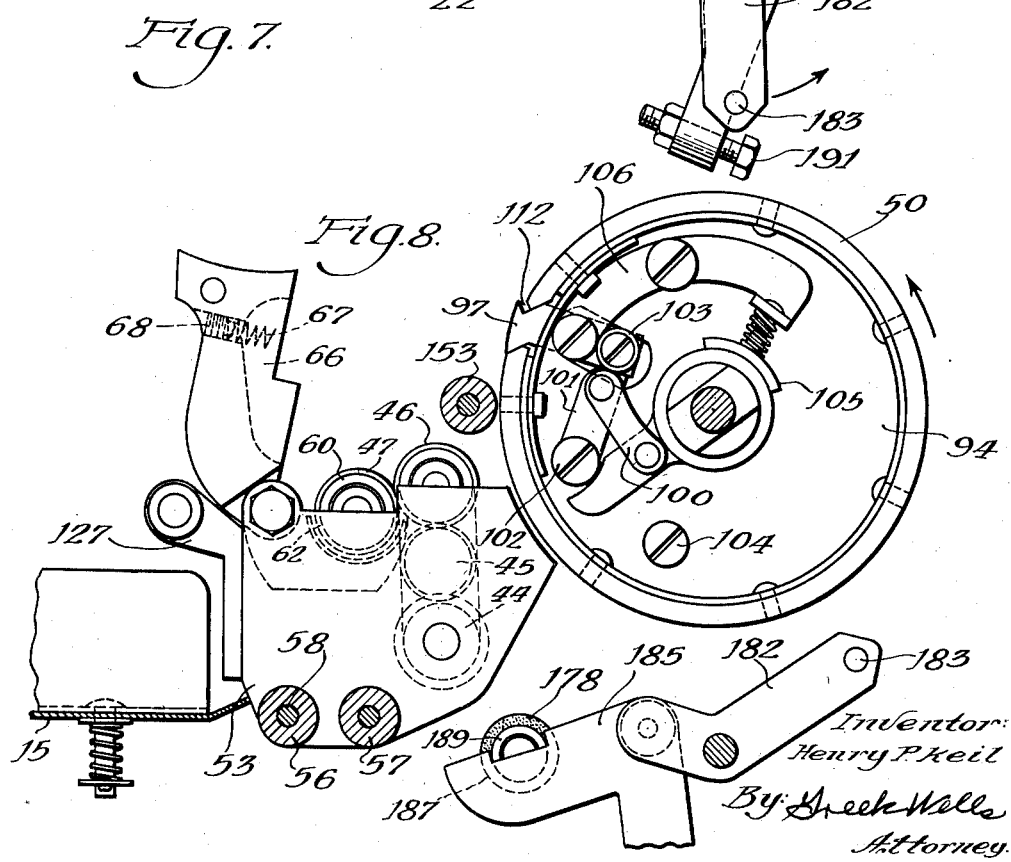

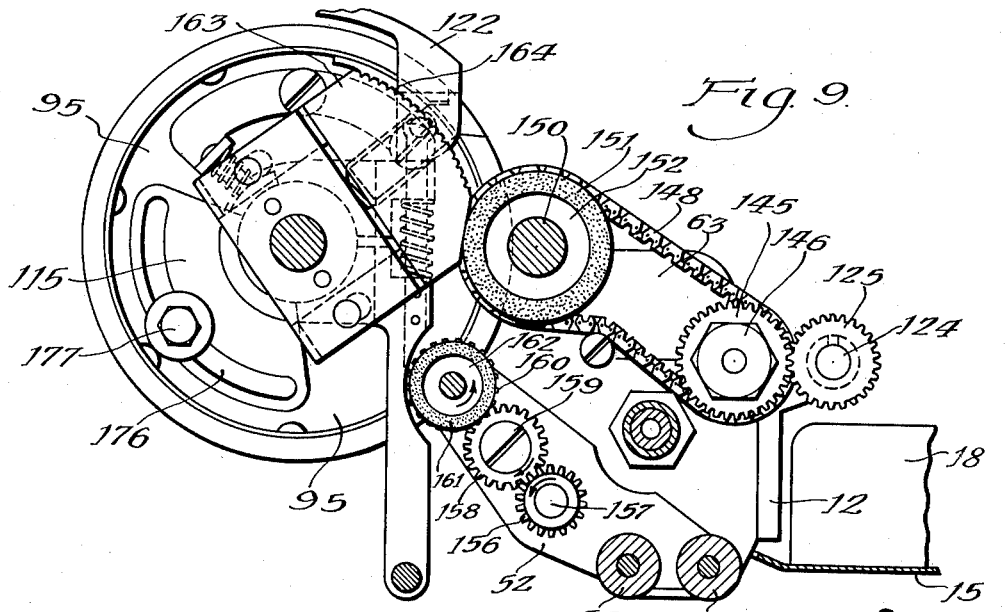
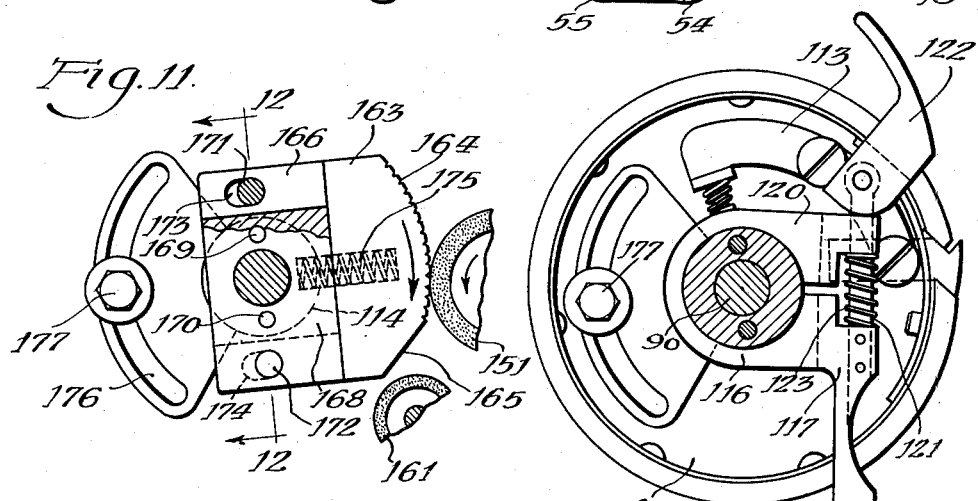
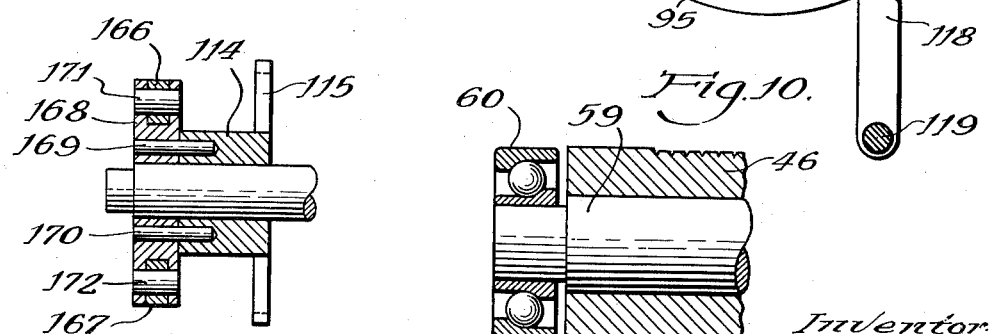

April 22, 1952      H. P. KEIL      2,594,179
DUPLICATING APPARATUS
Filed Feb. 5, 1947      13 Sheets-Sheet 9
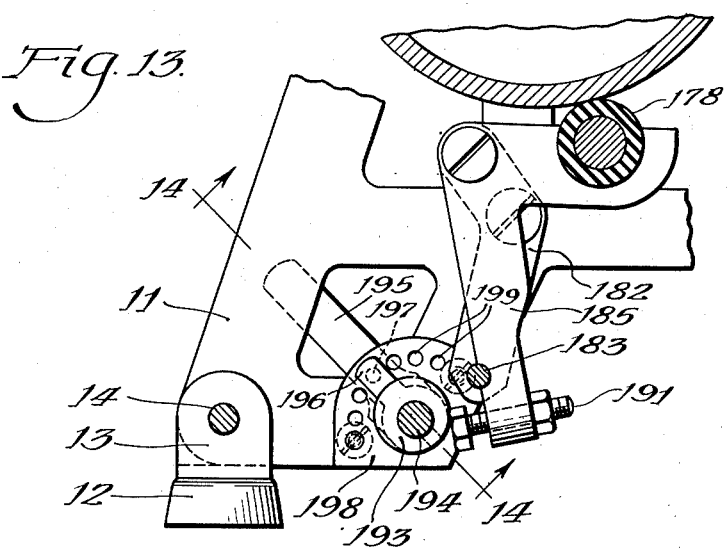
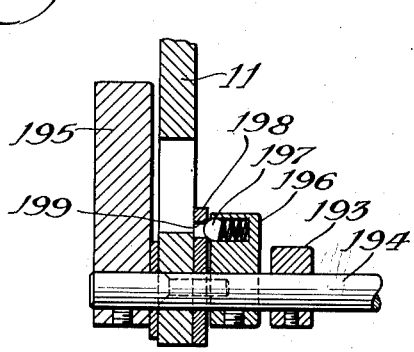
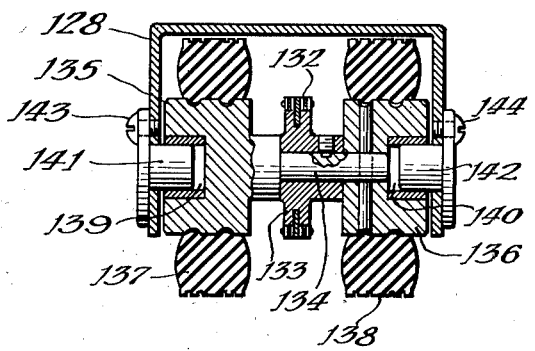
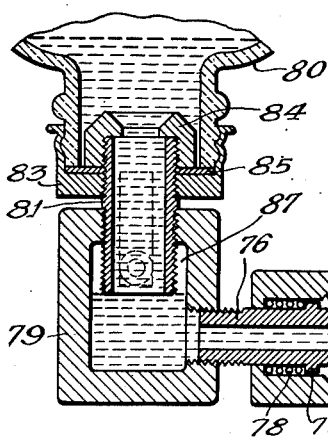
Inventor
Henry P. Keil
By: *Greek Wells*
Attorney April 22, 1952  H. P. KEIL  2,594,179
DUPLICATING APPARATUS
Filed Feb. 5, 1947  13 Sheets-Sheet 10
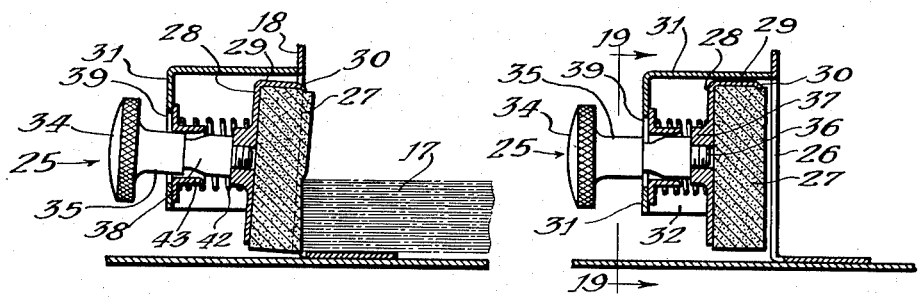
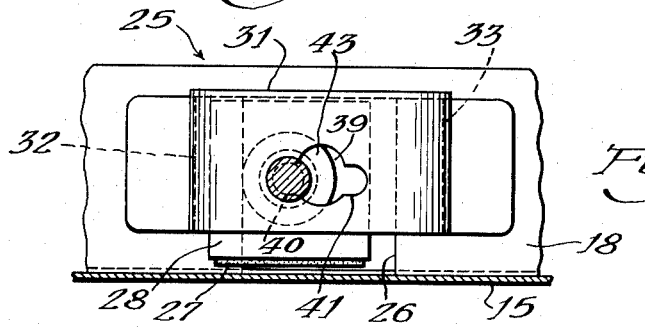
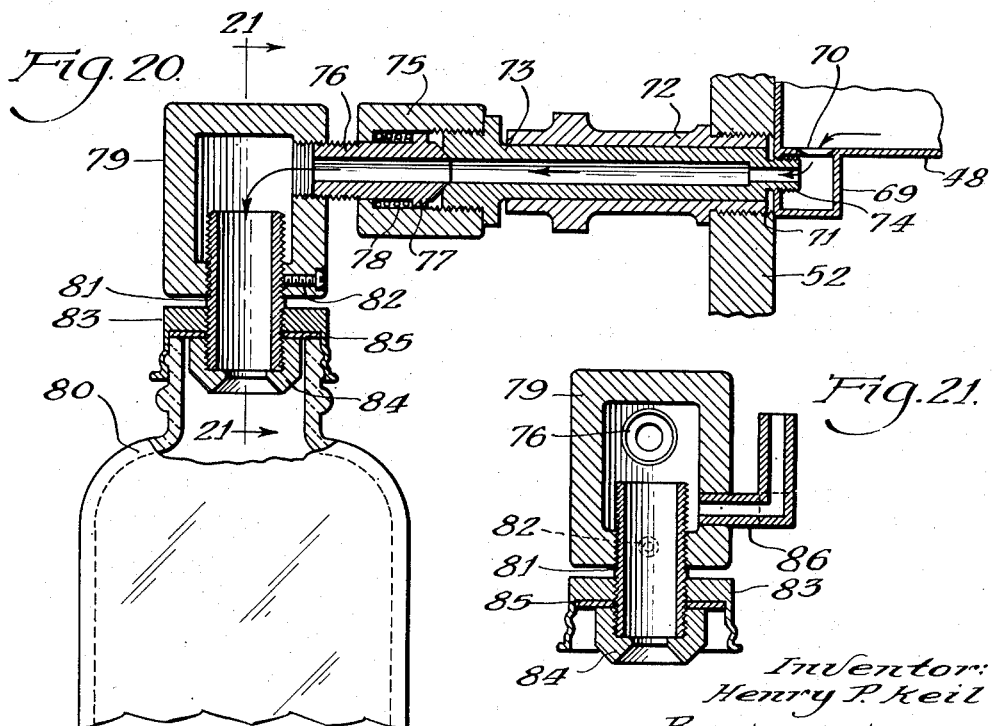
Inventor:
Henry P. Keil
By Geek Wells
Attorney

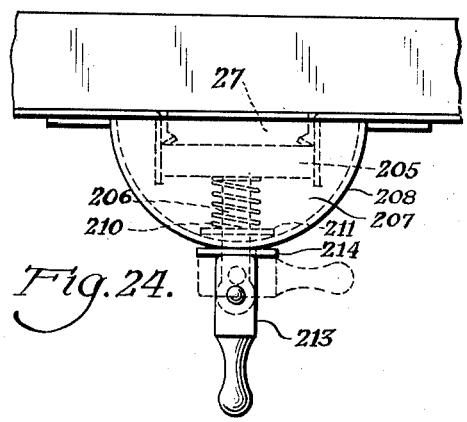
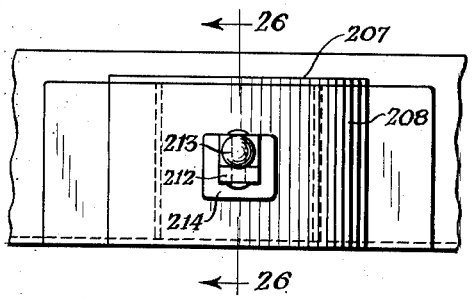
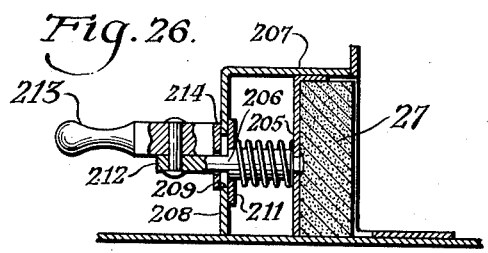
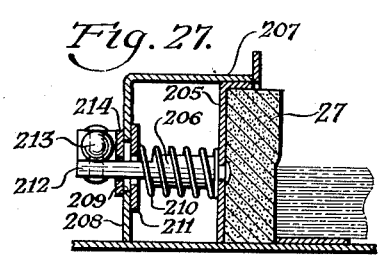
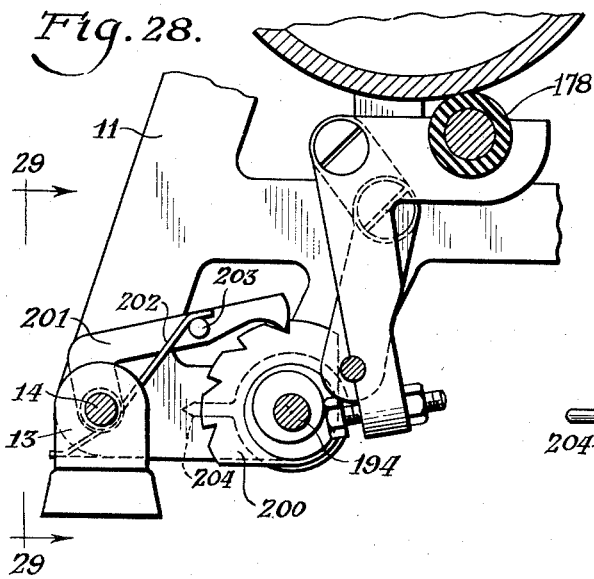
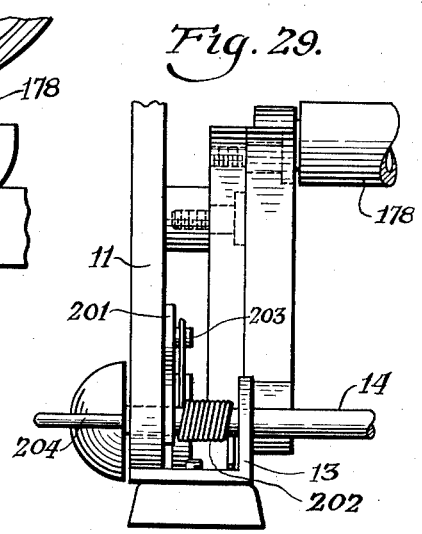

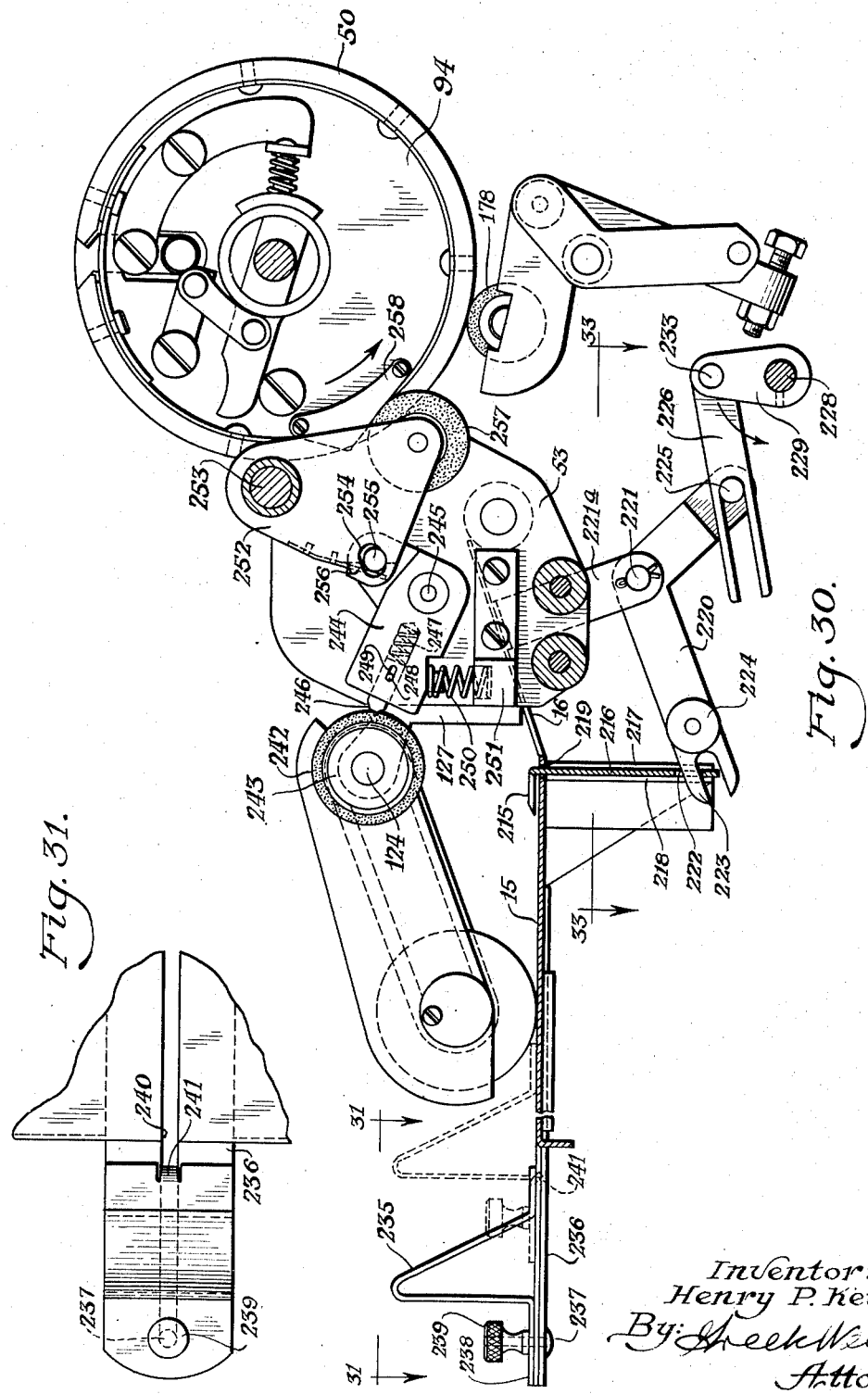

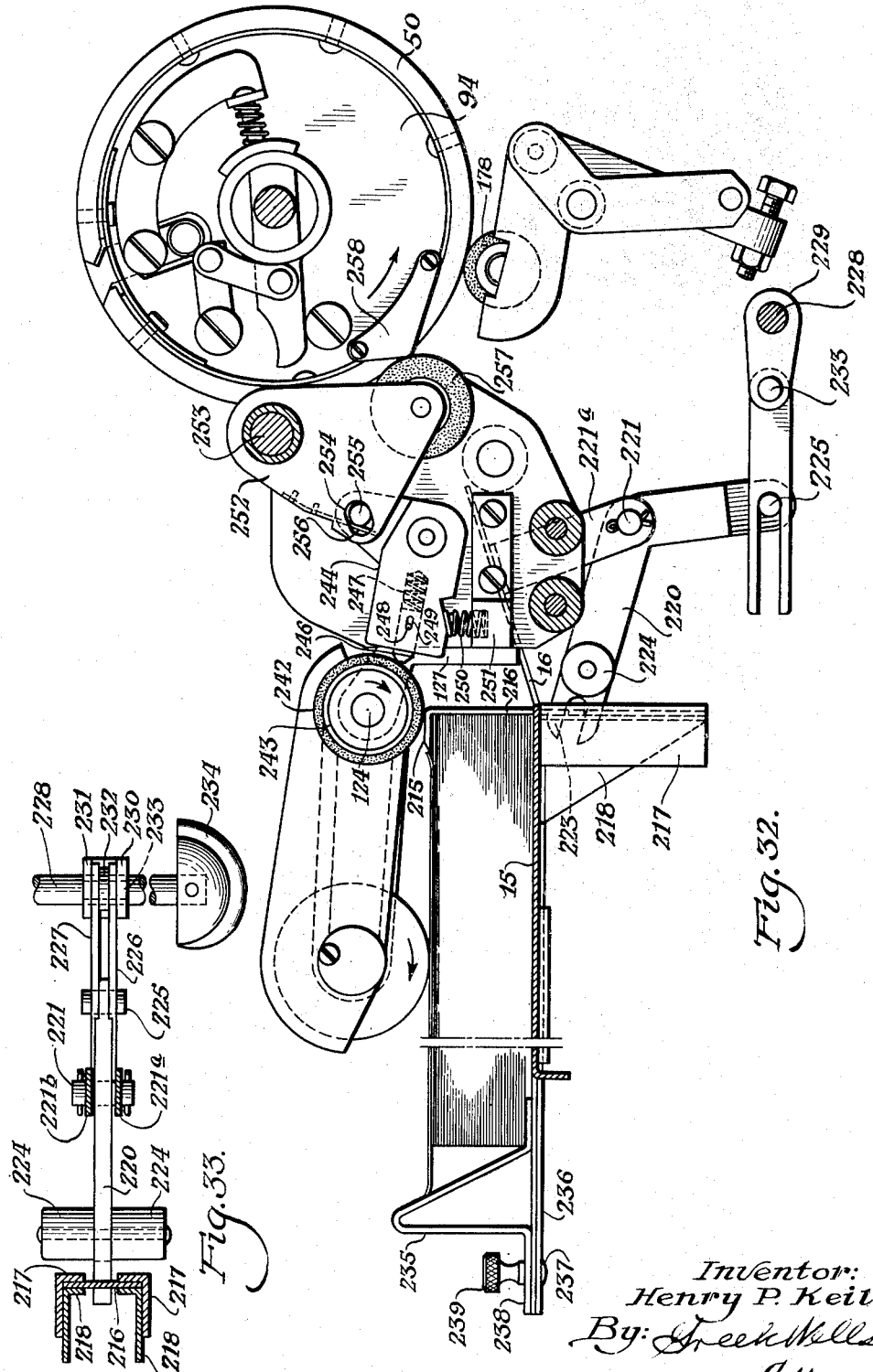

Patented Apr. 22, 1952

2,594,179

UNITED STATES PATENT OFFICE 2,594,179

DUPLICATING APPARATUS

Henry P. Keil, Chicago, Ill., assignor to The Fixture Hardware Corporation, Chicago, Ill., a corporation of Illinois Application February 5, 1947, Serial No. 726,502

6 Claims. (Cl. 101—132.5)

My invention relates to duplicating machines, and particularly to that type of duplicating machine usually referred to as a wet process duplicator. In such machines the master copy is formed in reverse on a master sheet which is then mounted on a drum. A copy sheet is moistened slightly with a solvent for the Hectograph ink on the master sheet, and then pressed against the master sheet by a platen roller as the drum rotates. In such machines proper moistening of the copy sheets and accurate feeding and engagement of the copy sheets with the master sheet are necessary. The moistening fluid is particularly difficult to handle because of its highly volatile nature, and its low surface tension. It is imperative too that the pressure of applying the copy sheet to the master be uniform and under control.

One form of my invention is shown as embodied in a machine of the general character above referred to. It is the principal purpose of my invention to provide a simplified machine construction wherein the main driving apparatus of the drum and paper feed mechanisms is accomplished in a novel and simple manner that eliminates inaccuracy due to loose fitting gears or worm cams, and that permits of ready margin adjustment with one operation that does not affect the sequence of operation in any way.

It is also an object of my invention to provide an improved arrangement of the moistening means whereby to eliminate the troubles resulting from feed of liquid to the moistening rollers and to permit of ready access to and removal of the moistening rollers for cleaning and inspection.

Another object of my invention is to provide an improved copy sheet holding and feeding means which holds a stack of copy sheets in such manner as to grasp the top sheets most firmly and is quickly and easily released for the replenishment of the copy sheet supply.

A further purpose of my invention is to provide an improved mechanism for gripping and releasing the master sheet on the drum.

It is also a purpose of my invention to provide a novel means to mount the platen roller whereby to maintain proper pressure of the copy sheet against the master sheet in operation and to provide for release of the pressure when the machine is not in operation to avoid flattening of the platen roller.

Other objects and advantages of the invention will appear from the following description and the accompanying drawings illustrating a preferred form of the invention. It should be understood however that the drawings and description are illustrative only, and they should not be considered as limiting the invention except insofar as it is limited by the claims.

In the drawings:

Figure 1 is a view in side elevation of a duplicating machine embodying my invention;

Figure 2 is a view like Figure 1 but showing the other side of the machine;

Figure 3 is a plan view of the machine;

Figure 4 is a rear end view of the machine;

Figure 5 is a front end view of the machine;

Figure 6 is a longitudinal sectional view of the machine on the line 6—6 of Figure 3;

Figure 7 is a fragmentary sectional view on the line 7—7 of Figure 4;

Figure 8 is a view on the same line as Figure 7, showing certain parts in changed position;

Figure 9 is a fragmentary sectonal view on the line 9—9 of Figure 4;

Figure 10 is an end view of the drum looking in the same direction as Figure 9;

Figure 11 is a fragmentary view partly in section illustrating the driving cam construction;

Figure 12 is a sectional view taken on the line 12—12 of Figure 11;

Figure 13 is a fragmentary sectional view taken on the line 13—13 of Figure 4;

Figure 14 is a sectional view taken on the line 14—14 of Figure 13;

Figure 15 is a sectional view taken on the line 15—15 of Figure 3;

Figure 16 is a sectional view taken longitudinally through the liquid feed means of the machine with the parts in position to supply liquid to the moistening means;

Figure 17 is a fragmentary sectional view taken on the line 17—17 of Figure 3;

Figure 18 is a view similar to Figure 17, showing the parts in a changed position;

Figure 19 is a fragmentary sectional view taken on the line 19—19 of Figure 18;

Figure 20 is a view like Figure 16, but showing the parts in position to drain the moistening liquid away from the moistening rollers;

Figure 21 is a fragmentary sectional view taken on the line 21—21 of Figure 20;

Figure 22 is a sectional view on the line 22—22 of Figure 7;

Figure 23 is a sectional view on the line 23—23 of Figure 22;

Figures 24, 25, 26 and 27 are detail views showing a modifiaction of the sheet holding means illustrated in Figures 17, 18 and 19;

Figures 28 and 29 are detail view illustrating a modification of the platen roller tension and release mechanism shown in Figures 13 and 14;

Figure 30 is a view taken on the line 7—7 of Figure 4 but showing additional features of the sheet feeding mechanism;

Figure 31 is a sectional view on the line 31—31 of Figure 30;

Figure 32 is a view like Figure 30, but showing the parts in changed position; and Figure 33 is a sectional view on the line 33—33 of Figure 30.

Referring now to the drawings, the machine embodying my invention is mounted by two side frames 10 and 11. These frames preferably are made of a suitable light material and are substantially alike. Aluminum or one of the lighter metal alloys would be suitable material for the frames. In finishing the machine, a decorative finishing shell of suitable sheet material is used to cover the side frame, but such finishing shell forms no part of the present invention and has not, therefore, been shown. The side frames are supported by suitable resilient foot pads 12, there being two such pads on each side frame. The pads 12 are bolted to brackets 13, which are overlapped with the lower edges of the frames 10 and 11 and threaded on a tie rod 14. Any suitable material such as rubber, synthetic rubber, or a vinyl resin may be used for the pads 12. There are two of the tie rods 14, one at the front of the machine and the other at the rear end of the machine.

At the front of the machine a copy sheet support comprising a sheet metal plate 15 is laid on top of the side frames 10 and 11, and secured to the frames. The plate 15 has its front edge extended beyond the side frames. The rear portion 16 of the plate 15 is bent up to form a guide to direct copy sheets, shown at 17, upwardly to the moistening mechanism to be described later. The plate 15 carries two side guides 18 and 19 for the copy sheets. These guides are adjustably mounted by means of elongated slots 20, 21, 22 and 23, in the plate 15 and spring clamps 24 which permit the side guides to be moved toward and away from each other. Each side guide mounts a gripper device 25 for gripping the side edges of the stack of copy sheets 17.

The gripper device 25 is shown most clearly in Figures 17, 18 and 19 of the drawings. The side guide 18 has a portion cut out at 26 to provide an opening for a resilient pad 27 of sponge rubber. The pad 27 is mounted in a metal holder 28 having flanges 29 on three edges thereof, the flanges being turned in as shown at 30 to grip the sponge rubber pad 27. The pad can thus be removed and replaced when it becomes worn. A housing for the pad 27 is composed of an angular cover strip 31 and two supporting side portions 32 and 33 struck up from the side guide 18 and welded to the cover strip 31. The holder 28 is provided with a handle having a knurled head 34 and a stem 35 the end 36 of which is reduced and threaded into a boss 37 on the holder 28. The stem 35 has a neck portion 38. The strip 31 has an aperture 39 which has two reduced lateral portions 40—41 large enough to receive the neck portion 38 of the stem 35, but smaller than the main portion of the stem. A spring 42 is mounted under compression between the holder 28 and a spring guide 43 that is positioned against the strip 31. The pad 27 is normally pressed against a stack of copy sheets 17 in the manner shown in Figure 17, so that it is tilted out of the vertical by virtue of the fact that only the lower portion of the pad is engaged by the sheets. This gives a concentration of the gripping effect at the top of the stack of copy sheets and insures effective holding of the sheets as they are progressively removed from the top. When new copy sheets are to be added, the pad is pulled back and moved lengthwise of the side guide until one of the portions 40—41 receives the neck portion 38 of the stem 35. The pad will be held in this position until it is released by manipulation of the head 34 to align the stem with the central portion of the aperture 39.

The rollers for feeding and moistening a copy sheet comprises a pair of feeding rollers 44 and 45. The lower roller 44 is the power roller and is driven by a suitable mechanism described later, in timed relation with the master sheet drum 50 and paper feeding mechanism 51. (See Figures 6–12 inclusive.) The roller 45 is used to spread moisture on the copy sheets and is driven by contact with the roller 44. The roller 44 has a yielding porous surface, preferably of porous rubber or cork. Any other suitable material may be used. The roller 45 preferably has a somewhat harder surface and this surface may be of such material as rubber or the synthetic rubber known as Neoprene. The surface of this roller may desirably be roughened.

Moistening fluid is supplied to the roller 45 by a roller 46 which is made of aluminum, a plastic composition, hard rubber, or some other relatively hard material. The surface of the roller 46 preferably has fine grooves running spirally around it, or is otherwise roughened. The roller 46 engages a hard surfaced roller 47 that supplies moisture to the roller 46 from a trough 48. The roller 47 may be of any suitable hard material such as aluminum, glass, porcelain, and may be smooth or roughened. It is known in the art to use various combinations of smooth and roughened rollers to distribute moistening liquid evenly upon a copy sheet. I find that the preferred combination for my purpose utilizes roller 47 as a smooth soft roller and roller 46 as a roughened roller. A guide strip 49 is provided beneath the trough 48 to guide the copy sheets into the rollers 44 and 45.

The roller assembly just described is supported by two side plates 52 and 53. These plates are secured by means of spacers 54, 55, 56 and 57. The spacers are mounted on the side frames 10 and 11 by means of headed screws 58. In Figure 22 (which is on the same sheet as Figure 7) and Figure 23 (which is on the same sheet as Figure 9) the detailed construction of the roller bearings and their mountings in the side plates 52 and 53 are shown. Each roller has a central shaft 59 which extends into a ball bearing 60. The outer race of the ball bearing rests in a slot 61 provided in the plate 52 or 53, and the several bearings for the rollers 44, 45 and 46 are simply stacked one upon the other so that they may be readily removed. The side plates 52 and 53 have semi-circular recesses 62 for the bearings 60 of the roller 47. The two side plates have upper hinged sections 63 and 64 which are similarly constructed, these sections being pivoted upon a shaft 65 at the ends of the side plates 52 and 53 most remote from the drum. These upper hinged sections are recessed as indicated at 66 in Figure 8 to receive the tops of the bearings for the rollers 46 and 47. A spring 67 is mounted in each of the hinged sections 63 and 64 and backed up by an adjustable screw 68 so that the tension of the spring on the bearings for the roller 46 may be varied. When it is desired to remove the several rollers for any purpose, they may be removed by throwing back the sections 63 and 64 as indicated in Figure 8, so that the rollers with their bearings can be lifted out of the side plates 52 and 53. This makes a very convenient assembly for the rollers. They can be kept in place when in use, and lifted out for cleaning or replacement, with a minimum amount of difficulty.

The liquid feeding means by which moisture is kept in the trough 48 is illustrated best in Figures 2, 5, 16, 20 and 21. The trough 48 is provided at one end with a small well 69 (see Figure 20) that opens into the trough through an aperture 70. The side plate 52 has an aperture 71 threaded to receive one end of a coupling member 72. The coupling member 72 receives a tube 73 which has a reduced extension 74 that is threaded into the well 69. The other end of the tube 73 is exteriorly threaded and enlarged to receive the cap member 75 of a packing gland and swivel coupling. The remainder of the swivel coupling member comprises a nipple 76 that extends into the cap 75 and has a flange 77 which is backed up by a spring 78 normally urging the nipple into sealing engagement with the tube 73. The engaging surface of the nipple and the tube are beveled and polished smooth so as to make a liquid tight coupling. The nipple 76 threads into a bottle supporting head 79 by which the liquid bottle 80 is connected to deliver liquid through the head 79 and the nipple 76 and the tube 73 to the well 69. The connection between the bottle 80 and the head 79 comprises a threaded tube 81 which extends into the head a substantial distance and is locked in place by a set screw 82. The other end of the tube 81 extends through a cap 83 on the bottle and is threaded into an inlet cup 84 which establishes a seal with the gasket 85 in the cap 83. In Figure 21 the head 79 is shown as provided with a vent 86 in the form of an L-shaped tube set into the side of the head 79.

The operation of the liquid feeding device is substantially as follows. The liquid bottle is adapted to occupy two positions, one being a raised position such as is shown in Figure 16 where it feeds the liquid directly into the well 69 by gravity, and the other position is shown in Figure 20 where the bottle is lowered to rest on the support alongside the machine and drain the liquid from the well 69 and the trough 48 back into the bottle 80. The vent 86 is positioned slightly above the level where it is desired to retain liquid in the trough 48. The part of the tube 81 that extends into the head 79 is of sufficient length to create an air lock chamber 87 (see Figure 16) so as to maintain the proper level of liquid in the trough. As the liquid is used up in the trough, it will continue to flow into the trough until the supply of liquid in the head 79 becomes low enough to permit air entering through the vent 86 to pass under the lower end of the tube 81 and raise up into the bottle to relieve the low pressure created in the bottle by the removal of liquid. Only enough liquid will flow down into the bottle to again fill up the head 79 sufficiently to seal off the lower end of the tube 81. In this way the liquid level control for the trough is maintained.

At the end of any operation when it is desired to leave the machine the bottle is simply turned from the inverted position shown in Figure 16 to the position shown in Figures 2 and 20. When this is done the liquid in the trough can return to the bottle through the well 79, the tube 73, the nipple 76, the head 79, and the tube 81. There will be a small amount of liquid trapped in the head 79 around the tube 81 but this amount is very slight. The liquid used in a machine of this character is highly volatile so that the copy sheets when moistened will dry quickly. It is generally an alcohol or a mixture containing a high percentage of alcohol and it is essential that as little liquid as possible be left exposed to air because of the evaporation thereof. With the construction just described the evaporation from the bottle 80 when the machine is not in use will be relatively small.

The driving means for the several rollers is connected so as to be operated by the drum 50 in its rotation. The drum construction is illustrated best in Figures 3, 4, 5, 7, 8, 9 and 10. The drum is mounted for rotation in the side frames 10 and 11 by a shaft 90. The shaft 90 is driven from a suitable drive member such as the handle 91 through gears 92 and 93, the gear 93 being adapted to rotate the shaft. The drum 50 has its heads 94 and 95 set in and riveted to the drum so as to form a rigid structure and to provide mounting means for the mechanism necessary to open and close a master sheet gripping bar 96. The bar 96 extends the full length of the drum, and has its gripping portion 97 extending through a slot 98 in the surface of the drum.

Referring now to Figures 7 and 8 particularly the construction by which the gripping bar 96 is caused to move from the position shown in Figure 7 to the position shown in Figure 8 comprises a lever arm 99 that is secured to the shaft 90 so as to rotate therewith. This lever arm has a link 100 which is connected to a cam lever 101 pivoted to the head 94 of the drum by a pivot screw 102. The cam lever 101 has its cam face positioned to engage a roller 103 that is secured on the end of the gripping bar 96. A stop pin 104 is positioned in the path of the lever arm 99 to limit its movement in one direction, and the pivot screw 102 limits the movement of the lever arm in the other direction. The head 94 has a curved lug 105 struck up therefrom and overlapping the circular hub 99a of the lever arm 99. The gripping bar 96 has a lever 106 pivoted thereto by the pivot screw 107. The lever 106 is also pivoted to the head 94 by a screw 108. A spring 109 is positioned on two spring guides 110 and 111 carried by the lug 105 and the lever 106 respectively, so as to normally urge the lever 106 in a direction to pull the gripping bar 96 into the position shown in Figure 7. The direction of rotation of the drum 50 is illustrated by the arrows in Figures 7 and 8 and normally the lever arm 99 is positioned as shown in Figure 7 so as to rotate the drum in the proper direction as the drive means 91 is operated. However if the direction of rotation of the shaft 90 is reversed and the drum held stationary, the lever arm 99 will be moved to the position shown in Figure 8. This causes the cam lever 101 to press against the roller 103 and rock the bar 96 about its pivot on the lever 106. Also in doing this the lever 106 is pushed outwardly at the end connected to the gripping bar so as to open the gripping slot (indicated at 112 in Figure 8) for the reception of a master sheet.

The drum must be held stationary while this reverse movement of the lever arm 99 takes place, and in order to hold the drum stationary I provide means shown best in Figure 10 for locking the drum against rotation. The lever 106 has a counterpart lever 113 on the head 95 of the drum, the connection being essentially the same as that of the lever 106. At this end of the drum the shaft 90 is journalled in a bearing ring 114 which has a flange 115 that is secured to the drum head 95. A split ring 116 surrounds the bearing ring 114. The split ring 116 has one jaw 117 provided with a downwardly extending arm 118 which is fixed to the side frame 10 by a pin 119. The other jaw 120 of the split ring 116 is free to move within limits so as to either clamp the bearing ring 114 or release it for rotation. The means for clamping the parts 117 and 120 together and for normally keeping them spread comprises a stem 121 extending from the jaw 117 upwardly through the jaw 120 where it pivotally mounts a cam lever 122, that is shaped to bear on the jaw 120 and force this jaw toward the jaw 117 when the cam lever 122 is moved from the position shown in Figure 9 to the position shown in Figure 10. A spring 123 is mounted on the stem 121 between the jaws so as normally to hold them separated and keep the jaw 120 in engagement with the face of the cam lever 122. The cam lever 122 is so positioned that it extends up alongside the end of the drum where it can be readily grasped by the operator and moved to locking position whenever it is desired to open the master sheet gripping bar 96.

Assuming that it is desired to open the gripping bar and insert a new master, the drum is brought to home position by the rotation of the member 91 and then the cam lever 122 is moved up into position to lock the drum against rotation. The member 91 is then turned in the reverse direction a short distance. This causes the lever arm 99 to move from the position shown in Figure 7 to the position shown in Figure 8, and causes the gripping bar 96 to open the slot 112. After a master sheet is inserted, the member 91 can be rotated in the normal direction and it will immediately close the gripping bar and clamp the master sheet in place. It is not even necessary to rotate the member 91 since the pressure of the spring 111 will turn the lever arm 99 to the position shown in Figure 7 unless it is prevented from doing so by holding the member 91. To release the drum for further operation it is then only necessary to return the cam lever 122 to the position shown in Figure 9, thus releasing the split ring 116 from the bearing ring 114 and freeing the drum for rotation.

The mechanism whereby the drum 53, the paper feed mechanism 51 and the power roller 44 of the feeding and moistening roller assembly are operated in timed relation is illustrated best in Figures 2, 3, 6, 9, 11 and 15. The paper feed mechanism 51 comprises a driven shaft 124 having a spur gear 125 thereon which is driven from the drum in a manner explained hereinafter. The shaft 124 is supported on two brackets 126 and 127 that are mounted on the plates 52 and 53. Intermediate its ends the shaft 124 has a housing 128 of the paper feed mechanism 51 pivoted thereon between two collars 129 and 130 (Figure 3). In the housing the shaft 124 has a sprocket wheel 131 non-rotatably mounted thereon. The sprocket wheel 131 drives a chain 132 which in turn drives a sprocket wheel 133 which is secured on a shaft 134. The shaft 134 is secured at its opposite ends by pins in the hubs 135 and 136 of two resilient rubber feed rollers 137 and 138 for feeding the paper sheets. The hubs are rotatably mounted in the housing 128 by means of bearing sockets 139 and 140 in the hubs and flanged stub shafts 141 and 142 that are secured to the housing by screws 143 and 144.

The gear 125 meshes with a gear 145 which is journalled on the shaft 65 and held in place by a nut 146 on a reduced end of the shaft 65, the gear 145 of course being outside the side plate 52. The gear 146 has a sprocket wheel portion 147 integral therewith by which a chain 148 serves to drive the gear 146. The chain is driven by a sprocket wheel 149 that is journalled on a stud 150 that is formed on the side frame 10. The wheel 149 has a resilient rubber driving rim 151 at the side thereof adjacent the frame 10 which is fixed on the hub 152 of the wheel 149. The stud 150 and a stud 153 on the frame 11 serve to secure the hinged sections 63 and 64, screws 154 and 155 being threaded into the ends of the studs 150 and 153 through the sections 63 and 64 for this purpose. The screws 154 and 155 must be removed in order to lift the sections 63 and 64.

The roller 44 is driven by a gear 156 that is secured on an extension 157 of the roller shaft by a set screw. The gear 156 has to be removed in order to lift the roller 44 from the side plates 52 and 53, but it is seldom necessary to remove this roller. The gear 156 meshes with a gear 158 which is secured by a stud 159 that is threaded into the side plate 52. The gear 158 meshes with a gear wheel 160 similarly mounted on the side plate 52. This gear wheel 160 has a resilient rubber driving rim 161 fixed on its hub 162.

The driving rims 151 and 161 are both turned intermittently by the drum through the medium of a driving cam 163 that turns with the drum. The cam 163 has a serrated curved driving face 164 and is bevelled at 165 in front of the serrated driving face. The driving cam 163 is mounted by two guide bars 166 and 167 (see Figure 12), which slide in a mounting block 168. The block 168 is drivingly connected to the member 114 by two pins 169 and 170. Two pins 171 and 172 riding in elongated slots 173 and 174 limit the movement of the bars 166 and 167 in the block 168. The cam 163 and the block 168 are recessed to receive a spring 175 under compression.

In operation the driving cam 163 first engages the resilient rim 151 and is pressed back by this engagement against the pressure of the spring 175 as the drum advances. This action tends to start the rotation of the rim 151 gradually which is of advantage in advancing the paper copy sheets and avoids wrinkling or buckling them. The cam 163 first advances the paper through its rotation of the rim 151 and consequent driving of the chain 148 and the paper feed mechanism 51. Next the cam 163 engages the rim 161 and starts the feeding and moistening rollers before the cam leaves the rim 151. The angular spacing of the two rims 151 and 161 with respect to the cam axis (the axis of the drum) determines the timing of the rotation of the feeding and moistening rollers with respect to the paper feeding by the mechanism 51.

The angular position of the drum with respect to the cam 163 determines the margin at the head of the copy sheet. This position is readily adjusted by means of the mounting flange 115 on the member 114. This flange has an arcuate slot 176 that receives a clamping screw 177 that is threaded into the head 95 of the drum. By releasing the screw 177 the drum and cam may be shifted with respect to each other to give any desired margin within the range of the slot 176.

The copy sheets are pressed against a master sheet on the drum by a platen roller 178. The control of this roller is accomplished by the mechanism illustrated best in Figures 1, 2, 4, 13 and 14. The platen roller can be moved between the two extreme positions shown in Figures 7 and 8 and can be readily removed. The side frames 10 and 11 have bosses 179 and 180, facing inward, to which two supporting lever arms 181 and 182 are pivoted. These arms are connected together at their lower ends by a cross bar 183. At their upper ends the bars mount two bell cranks 184 and 185 for pivotal movement. The bell cranks 184 and 185 have cradle portions 186 and 187 at their upper forward ends to receive the end bearings 188 and 189 of the roller 178. At their lower ends the bell cranks 184 and 185 have adjustable stops 190 and 191. These stops engage cams 192 and 193 on a shaft 194 that is journalled in the side frames 10 and 11. The shaft 194 has a hand lever 195 secured thereon outside the side frame 11. An arm 196 is fixed to the shaft 194 inside the frame 11 and carries a spring pressed ball 197. A plate 198 is secured on the side frame 11 and has seats 199 therein for the ball 197.

In operation the platen roller 178 is normally in the position shown in Figures 1, 4, and 6, to press against the drum. The pressure is adjusted by turning the hand lever 195 to cause the shaft 194 to rotate its cam 192 and 193 and move the stops 190 and 191 toward or away from the shaft 194. When the machine is not in operation it is best to free the platen roller from the drum. This is done by turning the hand lever 195 to its extreme limit in a clockwise direction as shown in Figure 1. When the platen roller is to be removed for cleaning etc. the bar 183 is pulled out toward the rear of the machine. This turns the lever arms 181 and 182 on their pivots to lower the bell cranks 184 and 185 and bring the platen roller away from the drum. This movement is illustrated in Figures 7 and 8. When the platen roller is in the position shown in Figure 8 it may readily be lifted out of the cradles at the upper ends of the bell cranks. The lever 195 must be in the release position when this is done, otherwise the pressure keeps the bar 183 from being pulled out.

In Figures 28 and 29 a modified form of detent means for the shaft 194 is shown. In this form a notched plate 200 is fixed on the shaft 194. A holding pawl 201 is pivoted on the adjacent cross tie rod 14 and is held against the plate 200 by a spring 202. One end of the spring 202 is hooked over a pin 203 on the pawl and the other end is held by the bracket 13. A pointer equipped hand lever 204 is secured to the shaft 194 outside the side frame 11.

In Figures 24 to 27 inclusive a modified form of side edge gripping device for the copy sheets is shown. The sponge rubber pad 27 is mounted in a holder 205 similar to the holder 28. The holder 205 has a stem 206 riveted thereto. The stem 206 extends through an opening 209 in the semi cylindrical wall 208 of a housing 207 for the pad 27. The stem has a spring 210 around it in the housing. The spring is under compression between the holder 28 and a washer 211. The stem 206 has a flattened end 212. A cam 213 is pivoted on the stem end 212 and bears against a washer 214 on the outside of the housing wall 208. The operation of this modification is believed to be clear from the showing in Figures 24, 26 and 27.

The paper feed mechanism 51 as previously described is not entirely reliable in separating single sheets from a stack of copy sheets. In Figures 30 to 33 inclusive I show additional mechanism that is incorporated in the machine for better separation and control of the copy sheets. This mechanism includes a clamp 215 for holding down the advancing edge of a stack of copy sheets on the plate 15. For the sake of clarity the side guides 18 and 19 are left off the drawings and with the edge clamp 215 the side grippers 27 are not necessary. The clamp 215 is carried by a slide plate 216 which is guided between two pairs of guides 217 and 218 at the rear end of the plate 15. The plate 15 is slotted as shown at 219 near its rear edge to allow the plate 216 to pass up through it.

The slide plate 216 is controlled by a weighted bell crank lever 220 which is pivoted by a pin 221 between arms 221a and 221b that are mounted on the portion 16 of the plate 15. One end of the lever 220 is bifurcated and engages with the slide plate 216 as shown in Figure 30. The plate 216 has an aperture 222 to receive the bifurcated end 223 of the lever 220. Weights 224 are mounted on the lever 220. The other end of the lever 220 has a pin 225 fixed therein. This pin 225 rides in the bifurcated ends of two links 226 and 227 that receive the lower end of the lever 220 between them. A shaft 228 is mounted in the side frames 10 and 11 and has a lever arm 229 fixed thereon. The arm 229 is bifurcated to provide spaced apart portions 230 and 231 that receive the links 226 and 227 and a washer 232 between them. A pivot pin 233 is secured in the portions 230 and 231 to provide pivotal connection of the links 226 and 227 with the lever arm 229. Figures 30 and 32 illustrate the two limiting positions of the copy sheet clamp 215. As the stack of sheets diminish in height the weights carry the clamp down. When a new stack of sheets is to be inserted the operator uses a hand piece 234 on the shaft 228 to move the parts to the position shown in Figure 32. In this position the clamp 215 is ready to receive the new stack of sheets.

The copy sheet supporting plate 15 is shown in Figures 30 to 32 as having a back stop 235 which is adjustable so it can be placed against the end of a stack of sheets on the plate 15. The plate 15 is provided with a rearwardly extended bar 236 which is secured beneath the plate 15. The bar and the plate are slotted at 240 to receive a clamping screw 237. The screw and a nut 239 clamp the portion 238 of the back stop 235 against the bar. The backstop 235 has a lip 241 at its front edge riding in the slot 240 to keep the backstop in alignment.

In order to accomplish the removal of a top copy sheet from the clamp 215 I provide means for driving the mechanism 51 in the reverse direction just prior to the time that the forward drive of the mechanism 51 by the cam 163 begins. Since the mechanism 51 is free of any connection to the drum except when the cam 163 is engaged with the ring 151 the reverse drive of the mechanism does not interfere with the forward feeding operations.

The reverse feeding mechanism comprises a resilient rubber ring 242 on a hub 243 that is fixed on the shaft 124 outside of the bracket 127. A bell crank 244 is pivotally mounted on the side plate 53 by a stub shaft 245. The bell crank 244 carries a drive finger 246 which is spring pressed toward the ring 242 by a spring 247. A pin 248 on the finger 246 rides in a slot 249 in the bell crank to limit the movement of the finger 246. A spring 250 is interposed between the bell crank 244 and a bracket 251 on the side plate 53. The bell crank 244 is driven by a cam lever 252 which is pivoted on a stud 253 that is secured on the side frame 11. The cam lever 252 has a cam slot 254 that receives a pin 255 on the bell crank 244. A leaf spring 256 is mounted on the cam lever 252 and bears on the pin 255. The cam lever 252 is provided with a roller 257 that is positioned to engage a cam 258 that is mounted on the head 94 of the drum 50.

The operation of the mechanism just described is as follows. As the drum approaches home position the cam 258 engages the roller 257 and moves the cam lever 252 in a clockwise direction to effect counterclockwise movement of the bell crank 244 from the position shown in Figure 30 to that shown in Figure 32. The finger 246 engages the ring 242 and turns the shaft 124 in the direction indicated by the arrows in Figure 32. This drives the wheels 137 and 138 in a direction to pull the top copy sheet rearwardly from the clamp 215. As soon as the sheet clears the clamp, the clamp drops down on the next sheet to hold it. The clamp is bevelled so that when the cam 163 engages the ring 151 to operate the wheels 137 and 138 in a direction to advance the copy sheet, the sheet will not catch on the clamp. The copy sheet is advanced against the feeding and moistening rollers and they in turn are driven by the cam 163 to advance the sheet to the drum 50 and the platen roller 178. When the cam 163 rotates the shaft 124 and the wheels 137 and 138, the finger 246 is returned by the ring 242 to the original position. The spring 250 aids the return and relieves the ring 242 from the pressure of the finger and the bell crank 244.

Having thus described my invention, I claim:

1. A duplicating machine comprising a master sheet drum, a platen roller positioned to press copy sheets against a master sheet on said drum, means to rotate the drum, copy sheet moistening and feeding rollers for advancing copy sheets to the drum and platen roller, a copy sheet tray, sheet feeding means including a feed roller over said tray for engaging the top sheet of a stack of copy sheets on said tray, and means to drive the moistening and feeding rollers and said feed roller in timed relation to the rotation of said drum comprising driving wheels operably connected to the feed roller and one of the moistening and feeding rollers, said wheels being positioned adjacent one end of the drum, resilient rims on said wheels, a driving member mounted on said end of the drum and having a serrated portion for engaging said resilient rims, said serrated portion being movably mounted for limited radial movement with respect to the drum axis and spring means urging said portion toward the outward limit of its movement.

2. In a duplicating machine, a master sheet drum, a platen roller positioned to press copy sheets against a master sheet on the drum, means to rotate the drum, a first means and a second means to advance copy sheets to the drum and platen roller, including a first wheel and a second wheel spaced apart angularly about said drum and having resilient rim portions, and a cam on the drum for engaging said wheels in succession as the drum rotates.

3. In a duplicating machine, a master sheet drum, a platen roller positioned to press copy sheets against a master sheet on the drum, means to rotate the drum, a first means and a second means to advance copy sheets to the drum and platen roller, including a first wheel and a second wheel spaced apart angularly about said drum and having resilient rim portions, and a cam on the drum for engaging said wheels in succession as the drum rotates, said cam having a wheel engaging portion movably mounted for limited radial movement with respect to the drum axis and means yieldingly urging said portion radially outward.

4. In a duplicating machine, a master sheet drum, a platen roller for pressing copy sheets against a master sheet on the drum, means to advance copy sheets to the drum and platen roller and drive mechanism for said sheet advancing means, comprising a wheel operably connected to the sheet advancing means, a cam operably connected to the drum to rotate in unison therewith, the wheel having a resilient rim for engagement by the cam, and the cam having its wheel engaging portion yieldable radially of the cam.

5. A duplicating machine comprising a master sheet drum, a platen roller positioned to press copy sheets against a master sheet on said drum, means to rotate the drum, copy sheet moistening and feeding rollers for advancing copy sheets to the drum and platen roller, a copy sheet tray, sheet feeding means including a feed roller over said tray for engaging the top sheet of a stack of copy sheets on said tray, and means to drive the moistening and feeding rollers and said feed roller in timed relation to the rotation of said drum comprising, a driving cam on one end of the drum, two wheels spaced apart angularly in the path of said cam and having resilient rim portions engaged by the cam, means drivingly connecting the first wheel engaged by the cam as the drum rotates with the feed roller, means drivingly connecting the other wheel with the feeding and moistening rollers, a second cam on said drum, a lever pivoted on the framework having a cam roller for engaging said second cam, the second cam and the lever being so positioned with respect to the drum to engage and disengage before the first named cam engaged the first wheel as the drum is rotated, means operable by said lever to turn said feed roller in the reverse direction to that in which the feed roller is turned by the first wheel, and a clamp on the feed tray holding down the forward edges of copy sheets thereon, the reverse movement of said feed roller operating to remove the top copy sheet from said clamp.

6. A duplicating machine comprising a master sheet drum, a platen roller positioned to press copy sheets against a master sheet on said drum, means to rotate the drum, copy sheet moistening and feeding rollers for advancing copy sheets to the drum and platen roller, a copy sheet tray, sheet feeding means including a feed roller over said tray for engaging the top sheet of a stack of copy sheets on said tray, and means to drive the moistening and feeding rollers and said feed roller in timed relation to the rotation of said drum comprising, a driving cam on one end of the drum, two wheels spaced apart angularly in the path of said cam and having resilient rim portions engaged by the cam, means drivingly connecting the first wheel engaged by the cam as the drum rotates with the feed roller, and means drivingly connecting the other wheel with the feeding and moistening rollers.

HENRY P. KEIL.

REFERENCES CITED

The following references are of record in the file of this patent:

UNITED STATES PATENTS

| Number | Name | Date |
|---|---|---|
| 2,083,044 | Storck | June 8, 1937 |
| 2,126,514 | Storck et al. | Aug. 9, 1938 |
| 2,142,449 | Marchev | Jan. 3, 1939 |
| 2,165,231 | Curtis | July 11, 1939 |
| 2,204,715 | Wimmer | June 18, 1940 |
| 2,268,045 | Marchev | Dec. 30, 1941 |
| 2,271,801 | Morrison et al. | Feb. 3, 1942 |
| 2,271,954 | Rockhill | Feb. 3, 1942 |
| 2,299,994 | Kokay | Oct. 27, 1942 |
| 2,374,039 | Rockhill | Apr. 17, 1945 |

FOREIGN PATENTS

| Number | Country | Date |
|---|---|---|
| 290,478 | Germany | Mar. 1, 1916 |
| 325,880 | Italy | Apr. 15, 1935 |